US012004282B2

(12) United States Patent
Cartrette et al.

(10) Patent No.: US 12,004,282 B2
(45) **Date of Patent: *Jun. 4, 2024**

(54) HYBRID DIMMING CONTROLLER WITH MULTI-CLASS OUTPUTS

(71) Applicant: The Watt Stopper, Inc., Carlsbad, CA (US)

(72) Inventors: Jonathan P. Cartrette, Carlsbad, CA (US); Erick E. Betancourt-Ochoa, Carlsbad, CA (US)

(73) Assignee: The Watt Stopper, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,053

(22) Filed: Sep. 9, 2022

(65) Prior Publication Data

US 2023/0007756 A1 Jan. 5, 2023

Related U.S. Application Data

(63) Continuation of application No. 16/907,053, filed on Jun. 19, 2020, now Pat. No. 11,445,591, which is a continuation of application No. 15/973,235, filed on May 7, 2018, now abandoned, which is a continuation of application No. 15/401,901, filed on Jan. 9, 2017, now Pat. No. 9,967,954.

(60) Provisional application No. 62/279,574, filed on Jan. 15, 2016.

(51) Int. Cl.

| | |
|---|---|
| ***H05B 47/185*** | (2020.01) |
| ***H01R 13/512*** | (2006.01) |
| ***H01R 13/53*** | (2006.01) |
| ***H05B 45/10*** | (2020.01) |
| ***H05B 45/382*** | (2020.01) |

(52) U.S. Cl.
CPC ......... *H05B 47/185* (2020.01); *H01R 13/512* (2013.01); *H01R 13/53* (2013.01); *H05B 45/10* (2020.01); *H05B 45/382* (2020.01)

(58) Field of Classification Search
CPC .... H05B 47/185; H05B 45/10; H05B 45/382; H01R 13/512; H01R 13/53
See application file for complete search history.

(56) References Cited

U.S. PATENT DOCUMENTS

| | | | | |
|---|---|---|---|---|
| 7,499,261 B2 * | 3/2009 | Hash | H05B 39/086 307/115 |
| 8,604,711 B2 * | 12/2013 | Pearlman | H05B 47/175 315/307 |
| 8,963,437 B2 * | 2/2015 | Wu | H05B 45/46 315/200 R |
| 9,401,588 B2 * | 7/2016 | Zulim | H02M 5/293 |

(Continued)

*Primary Examiner* — Dylan C White
(74) *Attorney, Agent, or Firm* — Crockett & Crockett, PC; K. David Crockett, Esq.; Niky Economy Syrengelas, Esq.

(57) ABSTRACT

A hybrid dimming controller for a lighting control system providing isolated class 1 and class 2 dimming outputs. The controller has two NEC class 1 outputs for providing independent low-voltage dimming-control signals for two lighting loads and two NEC class 2 outputs for providing the same two independent dimming control-signals for the lighting loads. Thus, the controller has both a class 1 and a class 2 outputs for delivering the same dimming-control signal for each of the two lighting loads while maintaining within the controller the isolation that is required between class 1 and class 2 circuits.

5 Claims, 4 Drawing Sheets

(56) References Cited

U.S. PATENT DOCUMENTS

| | | | | |
|---|---|---|---|---|
| 9,678,116 | B2 * | 6/2017 | Leland | H05B 39/08 |
| 2014/0225528 | A1 * | 8/2014 | Clayton | H05B 47/175 315/294 |
| 2021/0265907 | A1 * | 8/2021 | Malone | H02M 1/4233 |

* cited by examiner

HYBRID DIMMING CONTROLLER WITH MULTI-CLASS OUTPUTS

RELATED APPLICATIONS

This application is a continuation of U.S. Ser. No. 16/907,053 filed Jun. 19, 2020, which is a continuation of U.S. Ser. No. 15/973,235 filed May 7, 2018, which claims priority from U.S. application Ser. No. 15/401,901 filed Jan. 9, 2017, now U.S. Pat. No. 9,967,954, which claims priority from U.S. Provisional Application 62/279,574 filed Jan. 15, 2016.

FIELD OF THE INVENTIONS

The inventions described below relate to the field of dimming controllers for lighting.

BACKGROUND OF THE INVENTIONS

Historically, 0-10V dimming signals for controlling light intensity have been transmitted over wires in cables that are part of and rated for a National Electrical Code (NEC) class 2 circuit. A class 2 circuit has sufficiently low voltage and current limitations such that the cables in the circuit do not have to be housed in raceway and conduit when they traverse the surface of a building. An NEC class 1 circuit can carry higher voltages and current, but the cables in such a circuit must be housed in raceway or conduit when they traverse the surface of a building. While different cables for different class 1 circuits can be routed together through common raceway and conduit, class 1 and class 2 circuits must be isolated from each other.

Recently, electrical cable manufacturers have started offering cables for use in NEC class 1 circuits that include power wires for transmitting line power 110-120V AC as well as low-voltage wires for transmitting a 0-10V dimming signal. The overall cable is rated for use in class 1 circuits.

Controllers for lighting control systems such as The Watt Stopper Inc.'s Digital Lighting Management system typically include inputs for line power and one or more sensors, such as occupancy and vacancy sensors. The line power is connected to one or more outputs for lighting loads within the controller through internal relays so that the lighting loads can be turned on or off based upon the status of the sensors. The controllers also typically include an output for a 0-10V dimming signal. The output is typically only suitable for a connection to a cable that is part of a class 2 circuit.

SUMMARY

The devices and methods described below provide for a hybrid dimming controller for a lighting control system providing isolated class 1 and class 2 dimming outputs. The controller has two NEC class 1 outputs for providing independent low-voltage dimming-control signals for two lighting loads and two NEC class 2 outputs for providing the same two independent dimming control-signals for the lighting loads. Thus, the controller has both a class 1 and a class 2 output for delivering the same dimming-control signal for each of the two lighting loads while maintaining within the controller the isolation that is required between class 1 and class 2 circuits. This provides an installer with greater flexibility when performing an installation of a lighting control system. The installer can choose to route the cable or wires transmitting the dimming signal through conduit or raceway for the class 1 circuits or could instead choose to route the cable or wires transmitting the dimming signal outside of such conduit or raceway.

The low-voltage dimming control signal may be a 0-10V signal. A subset of the class 2 outputs may be in the form of a class 2 connector. Each of the class 1 outputs may be in the form of two low-voltage wires, each of which has sufficient insulation for a class 1 circuit.

DETAILED DESCRIPTION OF THE INVENTIONS

Figure 1:
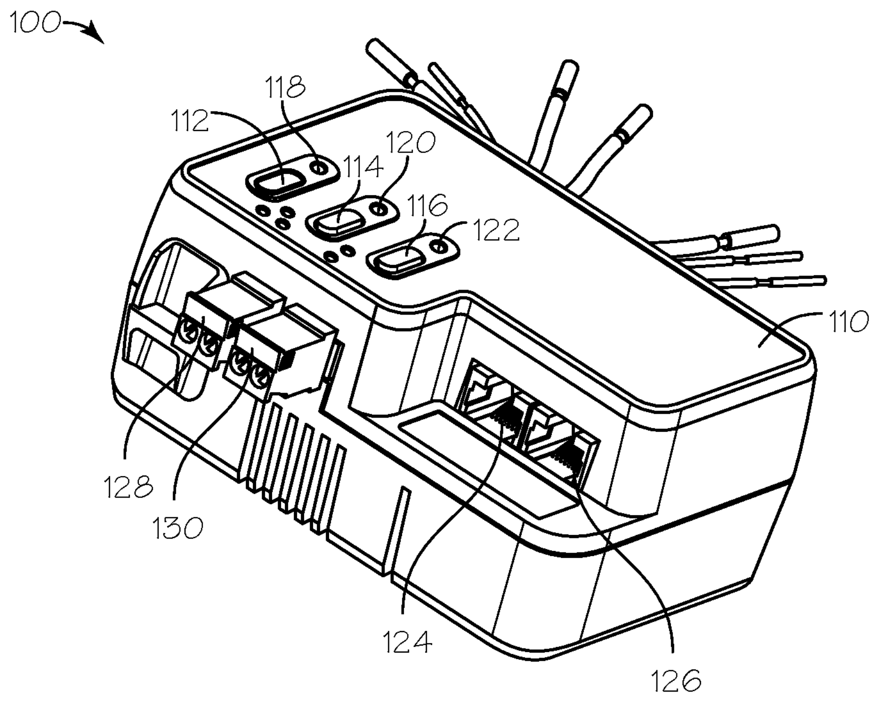
FIG. 1 is a front perspective view of a controller for a lighting control system.
Figure 3:
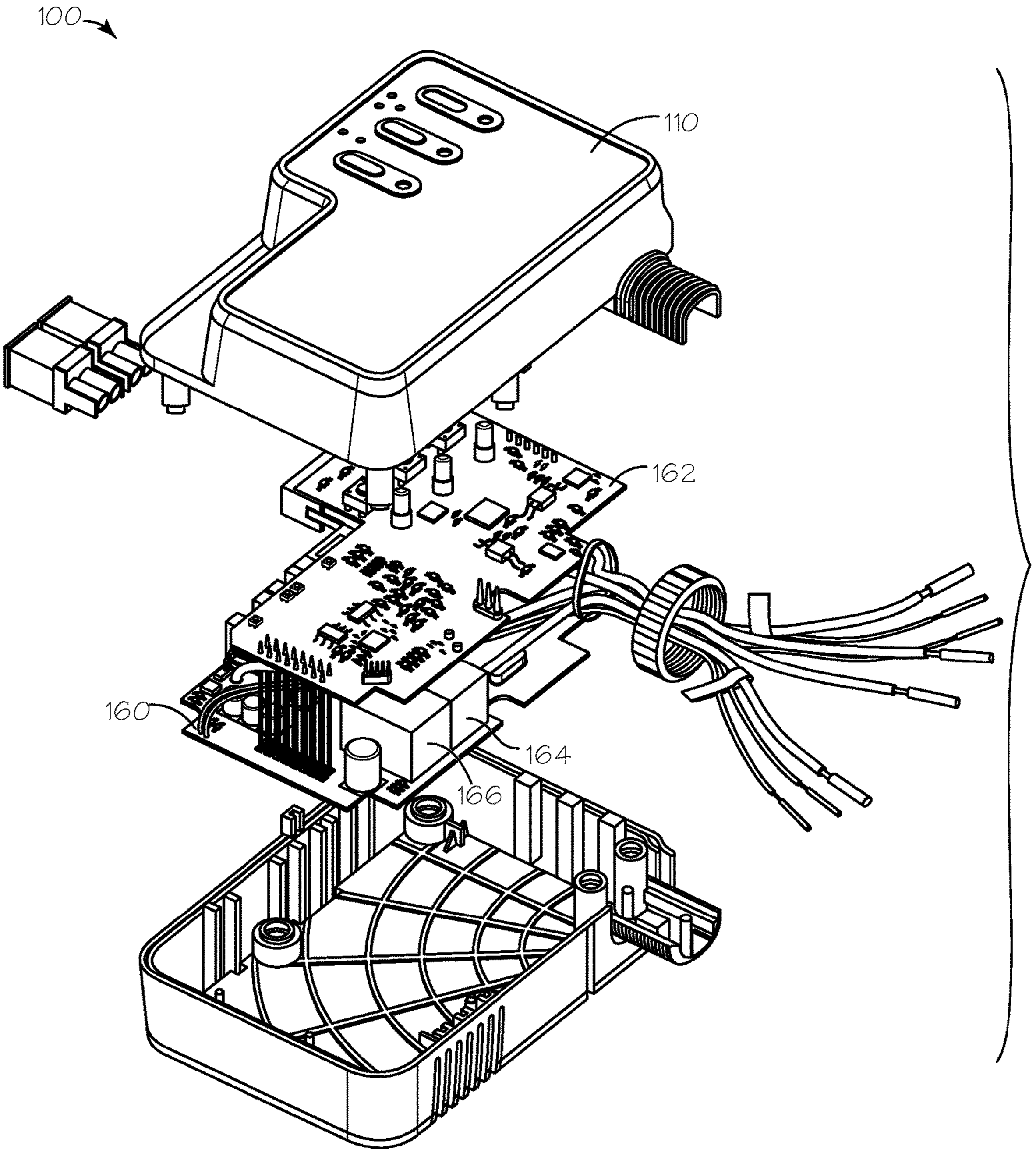
FIG. 3 is a rear exploded perspective view of the controller of FIG. 1.

FIG. 1 shows a perspective view of a controller 100 for a lighting control system according to the present disclosure. The controller 100 can communicate directly or through a network with one or more sensors (not shown) and can turn-on, turn-off, or change the intensity of, i.e., dim, two lighting loads, hereafter referred to as lighting loads A and B, according to the status of one or more of the sensors. Each of lighting loads A and B can be a single light source or a group of connected light sources. The sensors can be, for example, occupancy or vacancy sensors of the passive infrared or ultrasound type. Controller 100 includes a housing 110. The top surface of housing 110 includes three buttons, switches or other suitable controllers 112, 114, and 116, and corresponding LEDs 118, 120, 122. Buttons 116 and 114 are for manually connecting and disconnecting lighting loads A and B, respectively, to AC power via relays 164 and 166 inside of the controller 100 which are illustrated in FIG. 3. LEDs 122, 120 each indicate the status of, respectively, the relay for loads A and B, i.e., whether or not that relay is in a power-connection state. Button 112 is for controller configuration. Button 112 can be used to put the controller into a learn mode. LED 118 adjacent to button 112 blinks periodically, for example once every three seconds, when the controller's communication channel is operating properly.

The front of controller 100 includes two network ports 124, 126. Each of networks ports 124, 126 can be used to connect directly to a sensor. Alternatively, one of network ports 124, 126 can be used to connect to a computer network through a router, switch, hub, or other type of network device, so that the controller 100 can communicate with other controllers, as well as with sensors that are not directly connected to controller 100.

The front of controller 100 also includes two low voltage connectors 128, 130. Each one of connectors 128, 130 can receiving two low-voltage wires for transmitting a low-voltage signal. Connector 128 can output a 0-10V dimming-control signal for lighting load A, and connector 130 can output a 0-10V dimming-control signal for lighting load B. Two low-voltage wires connected to connector 128 or connector 130 can transmit a dimming-control signal to the appropriate dimming device for the lighting load, for example, an LED driver or a ballast for fluorescent lighting.

Thus, through connectors 128, 130, controller 100 can provide two independent dimming-control signals for independent dimming control of two lighting loads or two groups of lighting loads.

Figure 2:
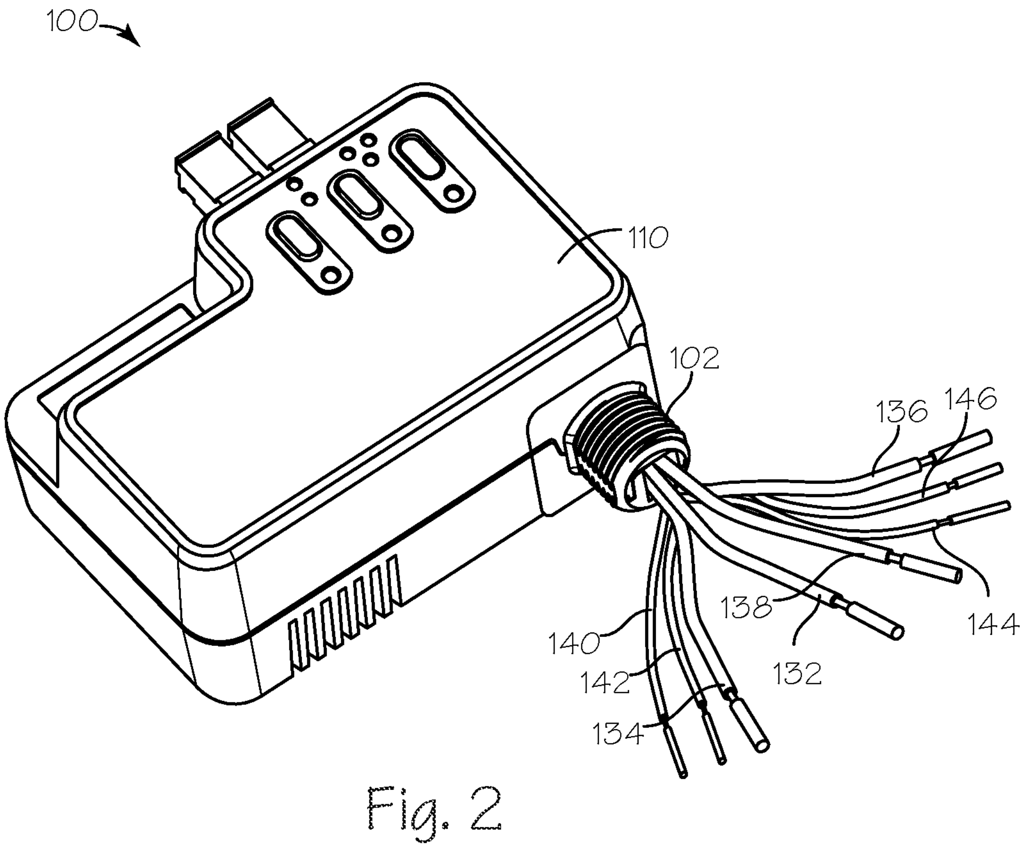
FIG. 2 is a rear perspective view of the controller of FIG. 1.

FIG. 2 shows a rear perspective view of the controller 100 shown in FIG. 1. The rear side of controller 100 includes a knock-out ("KO") nipple 102 having threads on its outer surface. The KO nipple can be used to mount the controller 100 to, for example, an opening in a high-voltage electrical box. Exiting the controller 100 through the KO nipples are five wires. Power wires 132, 134, and 136 are respectively for input power, output power for lighting load A, and output power for lighting load B. Power wire 138 is a neutral wire that is shared by lighting loads A and B. Low voltage wires 140, 142 are for providing a 0-10V dimming-control signal for lighting load A. Low voltage wires 140, 142 carry the exact same dimming-control signal that is output by connector 128. In this way, an installer of a lighting control system can choose to deliver the dimming-control signal via the class 1 wires 140, 142, which can travel in common enclosed spaces with other class 1 wires, including AC power wires, or via class 2 wires or a class 2 cable. This option provides the installer with greater flexibility when making the installation. Low voltage wires 144, 146 are for providing a 0-10V dimming-control signal for lighting load B. Low voltage wires 144, 146 carry the exact same dimming-control signal that is output by connector 130. In this way, an installer of a lighting control system can choose to deliver the dimming-control signal to lighting load B via the class 1 wires 144, 146, which can travel in common enclosed spaces with other class 1 wires, including AC power wires, or via bare class 2 wires or wires in a class 2 cable. This option provides the installer with greater flexibility when making the installation.

FIG. 3 shows a rear perspective exploded view of the controller 100 shown in FIG. 1. As can be seen in FIG. 3, inside of cover 112 of controller 100 there is a first circuit board 160 and a second circuit board 162. Circuit board 160 primarily holds components that transmit and affect AC power, although it also contains circuits that transmit DC signals. Relays 164 and 166 are mounted to first circuit board 160. Relays 164, 166 can be individually opened and closed to, in the case of relay 164, connect the AC power to the lighting load A, or, in the case of relay 166, to connect AC power to lighting load B. Second circuit board 162 primarily holds components that transmit and condition DC power signals, including the logic signals input and output from the controller's main processor, as well as the class 2 circuits. Using separate boards helps to maintain the separation between class 1 and class 2 circuits that is required by the NEC.

Figure 4:
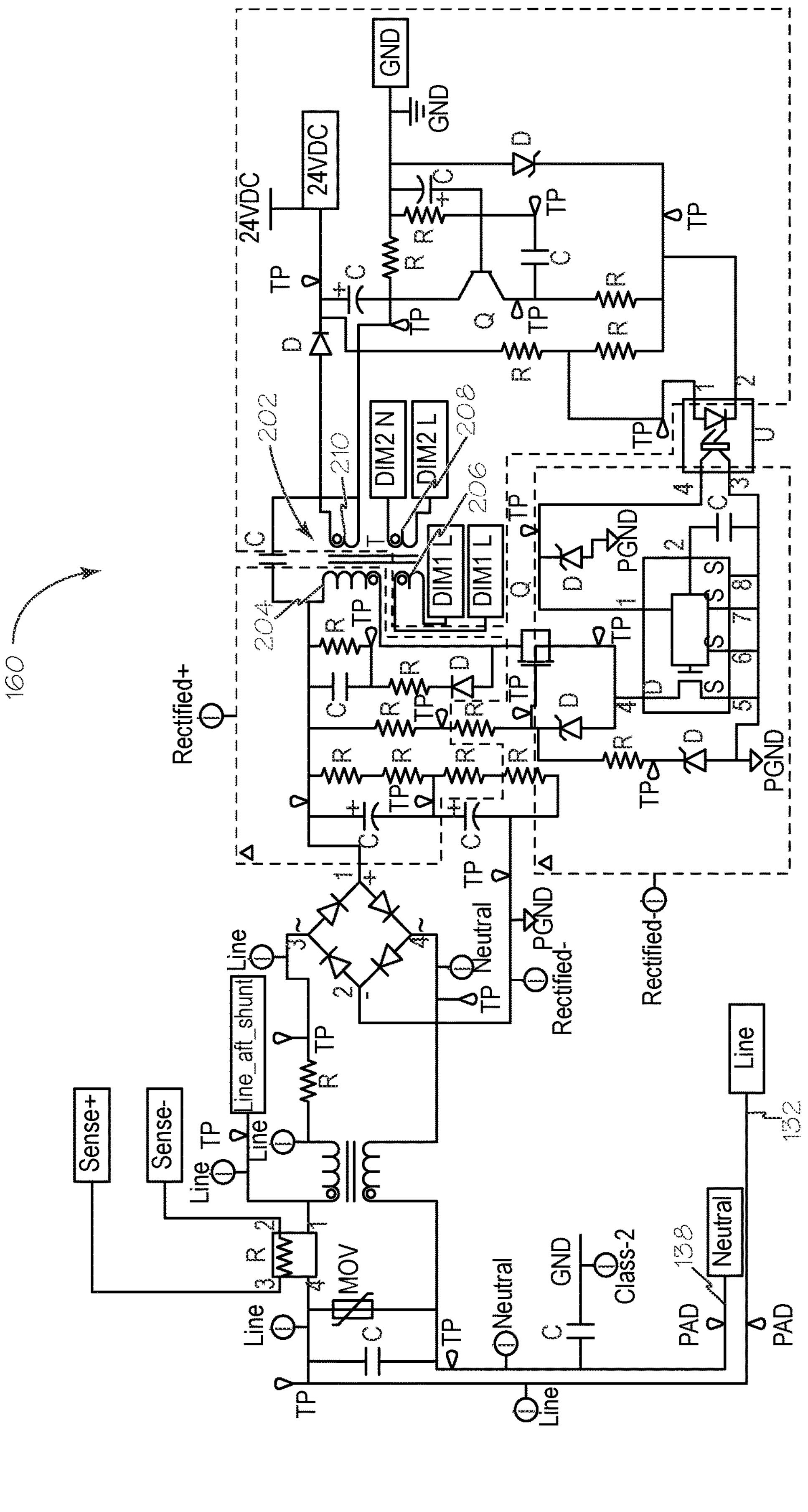
FIG. 4 is a schematic diagram of a first portion of circuitry in the controller of FIG. 1.

FIG. 4 shows a schematic of part of the circuitry located on the AC circuit board 160 in the controller 100 shown in FIG. 1. A high-voltage pulsating signal passes through the input coil 204 of a transformer 202. Input coil 204 is part of a class 1 circuit and therefore is able to carry the high-voltage signal. The transformer has three output coils 206, 208, 210. The pulsating signal passing through input coil 204 induces a 12V pulsating signal in both coils 206 and 208. The 12V pulsating signal in coil 206 is used for the generation of the dimming signals that is suitable for class 1 transmission and the 12V pulsating signal in coil 208 is used for the generation of the dimming signals that are suitable for class 2 transmission. Thus, through the use of a transformer a high-voltage signal that can only be transmitted in a class 1 circuit can be used to generate a suitable signal for use in low-voltage class 2 circuits without violating the requirement that class 1 and class 2 circuits be isolated from each other. The pulsating signal passing through input coil 204 induces a 24V pulsating signal in coil 210 that is used for powering the main processor and other logic circuits and for energizing the relays 164, 166.

Figure 5:
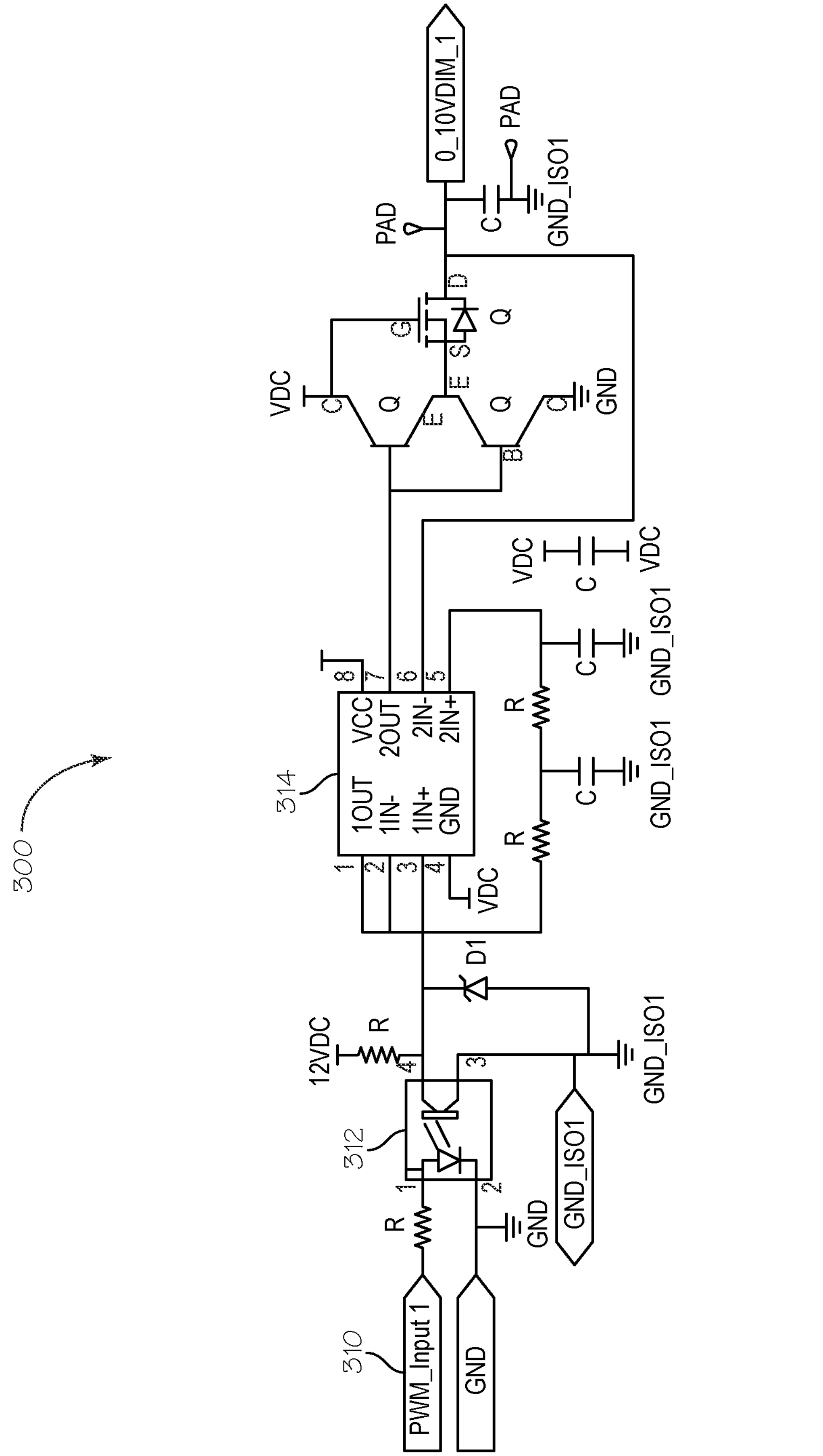
FIG. 5 is a schematic diagram of a second portion of circuitry in the controller of FIG. 1.

FIG. 5 shows a schematic of circuitry 300 that is used to condition a 12V DC signal into a 0-10V DC dimming-control signal. Controller 100 contains four sets of circuitry 300, two sets on circuit board 160 and two sets on circuit board 162. One of the sets of circuitry 300 on each of first and second circuit boards 160, 162 is for generating a dimming-control signal for load A. The dimming-control signal for lighting load A generated on first circuit board 160 is the exact same as the dimming-control signal for lighting load A generated on the second circuit board 162. The other of the sets of circuitry 300 on each of first and second circuit boards 160, 162 is for generating a dimming-control signal for load B. The dimming-control signal for lighting load B generated on first circuit board 160 is the exact same as the dimming-control signal for lighting load B generated on the second circuit board 162. In the case of the two sets of circuitry 300 on first circuit board 160, the 12V DC signal is created by conditioning the 12V pulsating signal generated in output coil 206 of transformer 202. In the case of the circuitry 300 on second circuit board 162, the 12V DC signal is created by conditioning the 12V pulsating signal generated in output coil 208 of transformer 202.

The particular level of the 0-10V signal output from circuitry 300 is determined by a pulse-width-modulated ("PWM") signal output by the main processor of controller 100. The duty cycle of the PWM signal determines the ultimate value of the 0-10V signal. That PWM signal is inputted to circuitry 300 at 310. A first PWM signal is input to both the circuit 300 on first circuit board 160 for lighting load A and the circuit 300 on the second circuit board 162 for lighting load A. However, for the circuitry 300 on first circuit board 160, that PWM input signal cannot directly interact with the rest of the conditioning circuit without interconnecting class 1 circuitry with a low-voltage digital-logic circuitry (the circuitry for the processors). Instead, the PWM input signal is passed through the input of the opto-coupler 312, which is part of the digital logic circuitry. The output of the opto-coupler 312 is part of the class 1 circuitry. The opto-coupler is able to reproduce the signal on its input at its output while maintaining isolation between the input and output by using light energy. Once the signal is transmitted to the class 1 circuitry it can be used to condition a 12V DC signal into a 0-10V DC signal that is related to the duty-cycle of the PWM signal using standard circuit components in a manner that will be apparent to a person having ordinary skill in the art. The circuit components include one or more operational amplifiers 314.

The same input PWM signal input to the circuitry 300 for load A on circuit board 160 is input to the circuitry 300 for load A on circuit board 162, where it is also transmitted via an opto-coupler, but this time to class 2 circuitry. The result is a class 2 dimming-control signal for load A on circuit board 162 that is the exact same as the class 1 dimming-control signal for load A that is generated on circuit board 160. Similarly, a second input PWM signal can be input to both the circuitry 300 for load B on circuit board 160 and the circuitry 300 for load B on circuit board 162. The result is a dimming-control signal for load B generated on circuit board 160 that is appropriate for class 1 transmission and an identical dimming-control signal for load B generated on circuit board 162 that is appropriate for class 2 transmission. In this manner, a single PWM input signal can generate a dimming-control signal in a class 1 circuit and the exact same dimming-control signal in a class 2 circuit without violating the separation required between class 1 and class 2 circuits.

Class 1 and class 2 circuits are defined by the National Electrical Code. As used herein class 1 circuits are (1) remote control or signaling circuits that do not exceed 600 volts or (2) power-limited circuits that do not exceed 30 volts, 1000 VA. As used herein, class 2 circuits are current limited remote control or signaling circuits that do not exceed 150 volts at 0.005 amps.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A dimming controller for a lighting load comprising:

a class 1 output operable to provide a class 1 dimmer signal contained within a first conduit;

a class 2 power output isolated from the class 1 contained within a second conduit, the class 2 output operable to provide a class 2 dimmer signal;

a first low voltage connector and a second low voltage connector, the first low voltage connector operable to receive and output the class 1 dimmer signal for the first lightning load and the second low voltage connector operable to receive and output the class 2 dimmer signal for the second lightning load;

a first output wire operably connected to the class 1 and class 2 outputs and operable to transmit the class 2 dimmer signal to a lighting load; and a second output wire operably connected to the class 1 and class 2 outputs and operable to transmit the class 1 dimmer signal to a lightning load;

wherein, through the low voltage connector, the dimming controller can provide two independent control signals for independent dimming control of the first and second lightning loads.

2. The dimming controller of claim 1 further comprising:

an isolated 24v power conditioner.

3. The dimming controller of claim 1 further comprising:

a class 1 relay for controlling power to the lighting load.

4. The dimming controller of claim 3 further comprising:

a switch for manually controlling the class 1 relay.

5. The dimming controller of claim 1 further comprising:

one or more network connectors for connecting lighting sensors and controls to the dimming controller.

* * * * *